June 25, 1968    M. B. ALLAN ET AL    3,389,920
FLOATING SEAL FOR ADJUSTABLE BLADE
Filed July 25, 1966    2 Sheets-Sheet 1

MICHAEL B. ALLAN
FEODOR KANGER
INVENTORS.

BY R A Eckersley

MICHAEL B. ALLAN
FEODOR KANGER
INVENTORS.

United States Patent Office 3,389,920
Patented June 25, 1968

3,389,920
FLOATING SEAL FOR ADJUSTABLE BLADE
Michael B. Allan, Westmount, Quebec, and Feodor Kanger, Montreal, Quebec, Canada, assignors to Dominion Engineering Works, Limited, Lachine, Quebec, Canada, a company of Canada
Filed July 25, 1966, Ser. No. 567,634
12 Claims. (Cl. 277—174)

This invention is directed to an improved rotary seal, being particularly directed to a seal structure for use in rotary bearings connecting massive machine components, such as the blades of a Kaplan turbine to the runner hub thereof.

In the assembly and operation of machines having heavy components mounted for rotation relative to another portion of the machine, wherein it is necessary to effect a reliable fluid seal between the moving member and the supporting portion of the machine, the problem arises that due to the mass of the supported member it is generally difficult to maintain the radial clearances of the rotary component within desired concentricity tolerance. The problem is further complicated during life of the machine by wear in the bearings, which produces a further sag of the component with resultant adverse changes in the concentricity of the seal structure.

An object of the present invention is to provide an improved seal structure to accommodate to radial misalignment between the components being sealed.

A further object of the present invention is to provide a seal structure wherein the resilient sealing ring members may be changed without enforcing disassembly of the supported member.

What is provided, in a seal assembly for a machine having a first major component rotatably secured to a second major component about a pivot axis, including an annular seal recess between the major components in substantially coaxial relation with the pivot axis, having a first continuous annular surface forming part of the recess in fixed sealed relation with one of the components and a second continuous annular surface forming part of the recess spaced from the first annular surface and in fixed sealed relation with the other of the components, is the improvement comprising an annular seal ring located within the recess and positioned to seal the space between the annular surfaces, having a first surface thereof in facing generally parallel spaced relation with the first recess surface, a second seal ring surface in facing generally paralled spaced relation with the second recess surface, first annular seal resilient ring means interposed between the first surfaces, second annular seal resilient ring means interposed between the second surfaces and seal ring mounting means locating the seal ring concentrically within the recess substantially independently of deviations of the major component from concentricity with the pivot axis.

Thus there is provided a seal assembly for a Kaplan-type runner having runner blades angularly rotatable in relation to the main hub of the runner about bearing supports extending inwardly from the blades, to prevent leakage between the interior and the exterior of the runner hub, comprising; a recess in the runner hub to receive the blade boss therein, an annular portion of the blade boss inner face together with an annular portion of the runner hub housing recess defining an annular recess arranged substantially coaxially with the axis of rotation of the blade relative to the boss; an annular floating seal member secured to the inner face of the blade boss in sealing and radial sliding relation therewith, having one or more circumferential grooves in the outer surface thereof to receive resilient sealing rings, being secured against rotation relative to the blade boss, an intermediate annular ring member enclosing the floating seal member in substantially coplanar and coaxial relation when in the operating position, having a radially inner annular surface in sealing contact with the at least one resilient sealing ring of the floating seal member and a radially outer annular surface in sealing relation with the recess in the runner boss having a resilient sealing ring interposed therebetween to effect sealing of the intermediate ring member to the runner boss housing; segmental seal retaining means secured to the intermediate ring and to the runner boss, means operable externally of the runner to reposition the intermediate ring axially within the housing, the floating seal member being similarly axially repositionable relative to the blade boss, whereby the resilient seal rings may be changed without removal of the runner blade from the runner, the floating seal member maintaining sealing of the runner interior despite minor misalignment of the runner blade rotation axis.

Prior practice has been to provide a seal carrying member rigidly attached to the structure, generally to the stationary member. Owing to the rigidity of the arrangement any sag in the turbine blades due to their weight and their suspension in cantilever fashion produces radial eccentricities having characteristic values such as 15 thousandths of an inch, while any increase in the bearing clearances during the life of the components due to wear further increases the undesirable eccentricity of radial clearances. By providing a floating seal-carrying ring having radial freedom of movement relative to the blade axis it is possible for the resilient seal rings to accommodate to reasonable eccentricites of radial clearance.

Certain embodiments of the present invention are described by way of example, reference being had to the drawings wherein.

Figure 1:
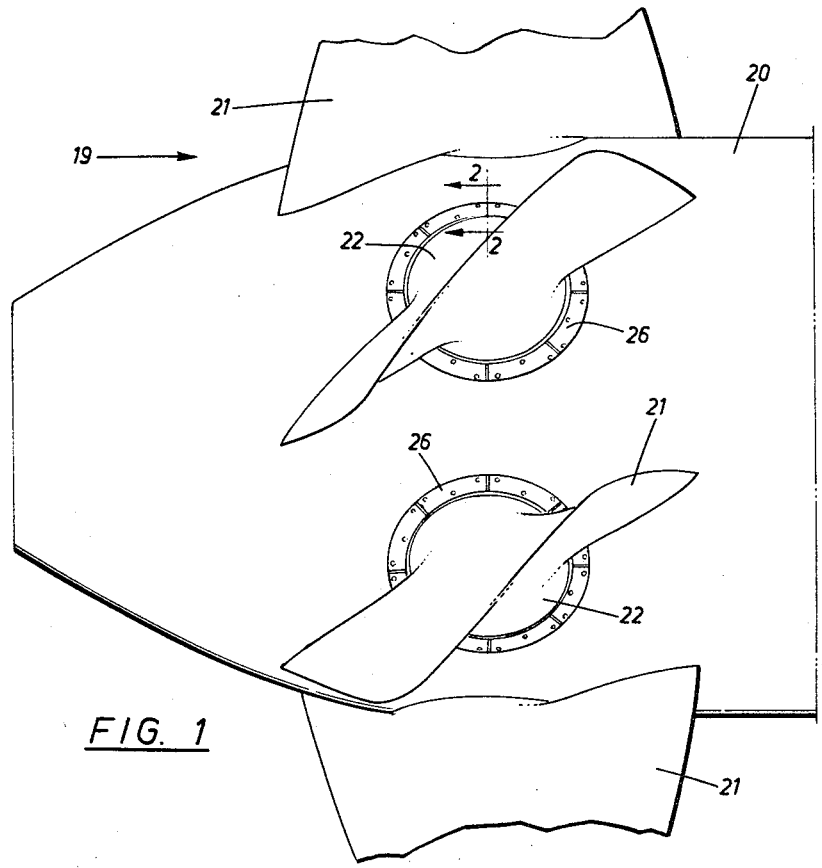
FIGURE 1 is a general view of a Kaplan-type runner embodying seals according to the present invention.

Referring to FIGURE 1 the Kaplan-type runner 19 includes a runner hub 20 having a plurality of blades 21 each mounted on a boss 22 for rotation in a pitch-changing sense about the polar axis of the boss, being individually mounted on bearings contained within the runner hub such as the arrangement described in United States Patent No. 3,175,803, R. A. Newey et al., which issued Mar. 30, 1965.

FIGURE 1 also shows the seal retaining segments 26 which may be removed to provide access to the seal as required.

Figure 2:
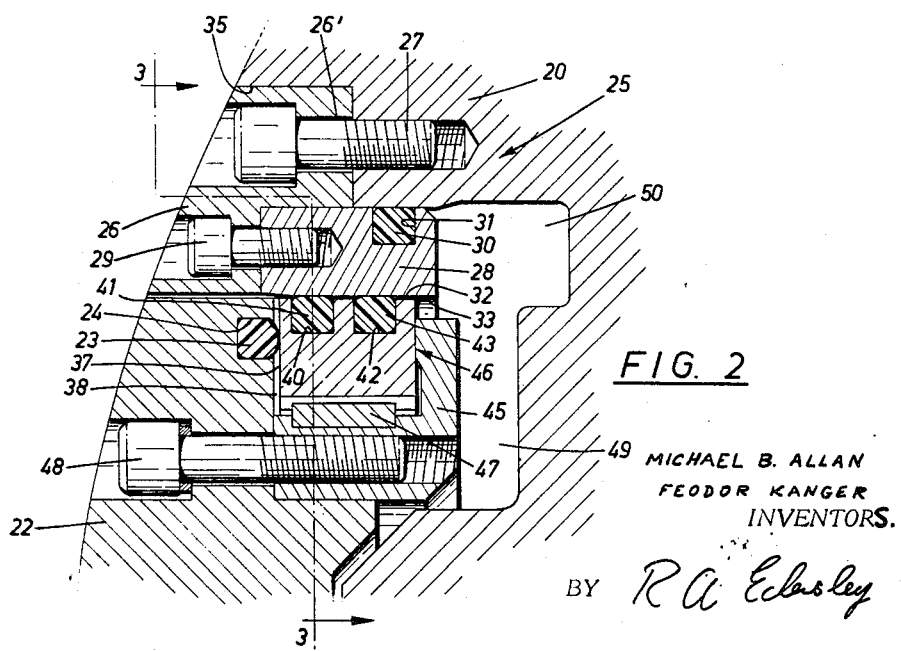
FIGURE 2 is a cross-section taken on the line 2—2 of FIGURE 1.
Figure 3:
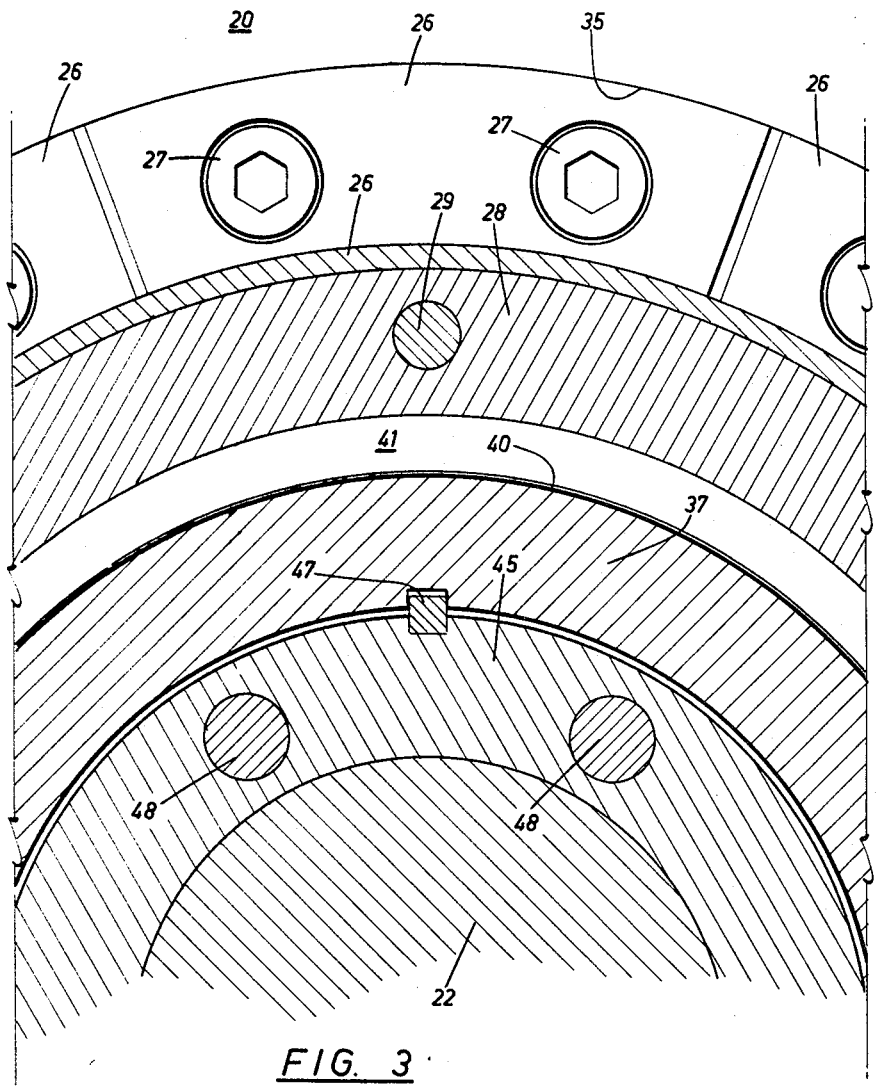
FIGURE 3 is a part section view on the plane defined by the line 3—3 of FIG. 2.

Referring to FIGURE 2, between the runner hub or boss 20 and the blade boss 22 is interposed an annular seal assembly 25 mounted in an annular hub recess 35 extending substantially concentric with the hub support bearing (not shown).

It will be appreciated from FIGURE 1 that the seal retaining segments 26 have an outer surface of segmented annular form curved to conform with the outer curvature of the runner hub 20. However, the relative dimensions are such that the inner face 26' of the segments 26 is substantially plane, as are all other of the axial end surfaces of the seal 25.

The seal assembly 25 comprises an intermediate annular ring 28 secured and sealed to the runner hub 20, a seal retaining ring 45 secured to the blade boss 22, and an annular floating seal ring 37 axially secured against an inner annular face of the blade boss 22 in sealing relation therewith, and effecting a resilient seal with the radially inner face 32 of the intermediate ring 28.

The floating ring 37 is keyed to the seal retaining ring 45 by means of a radial key 47, so that the ring 37 rotates with the hub boss 22 for pitch changes of the blades 21, but is free to accommodate radially to any eccentricities produced by sag of the blade boss or wear in the blade support bearing (not shown).

The seal between the axially outer end face 38 of the floating ring 37 and the inner annular surface of the boss 22 is effected by means of a resilient seal ring 23 such as an O-ring mounted in an annular groove 24 on an inner face of the boss 22. The seal between the intermediate ring 28 and the floating ring 37 is effected by means of a resilient sealing ring 41 mounted in a circumferential groove 40 on the floating ring 37. Provision of a second resilient sealing ring 43 in the groove 42 affords back-up in case of sealing ring failure.

The intermediate annular ring 28 is sealed to the runner hub recess 35 by means of a resilient seal ring 30 mounted in a groove 31 extending circumferentially thereabout. Intermediate ring 28 is secured to the runner hub 20 by means of cap screws 29 extending through the seal retaining segments 26, the segments being secured within the hub recess 35 by means of an outer ring of cap screws 27. Similarly, the floating seal retaining ring 45 is secured to the blade boss 22 by way of cap screws 48.

The runner hub recess 35 extends radially inwardly beyond the seal components to provide adjoining annular chambers 49, 50, which can receive the intermediate ring 28 and the seal retaining ring 45, thus permitting axial manipulation of the annular seal components to make the resilient seal rings 23, 30, 41, and 43 accessible for removal or replacement of the resilient seal rings. It will be appreciated that in order to conduct such an operation without removing the runner blades 21, it is necessary either to stretch the respective resilient rings over the blade 21, or to utilize a circumferentially joinable sealing ring construction.

Included in the particular advantages afforded by the present invention is the compensation afforded by the use of a floating seal ring to overcome sag occurring in the runer blade support bearing, which may produce eccentricity in the order of 20 thousandths of an inch, and bearing wear which also leads to such eccentricity. The invention permits the use of resilient sealing rings of moderate section which in turn facilitates replacement thereof if such becomes necessary. By securing the floating ring for rotation with the blade boss, wear of the resilient seal rings is mainly limited to the peripheral seal rings 41 and 43 which are more accessible for replacement than seal ring 23.

Owing to the ability of the floating seal ring to accommodate to misalignment of the blade axis, variation in the radial width of the annular space, to which the resilient seal ring must conform in order to seal, is reduced to a minimum, thereby avoiding either excessive compression of the resilient seal in the region of minimum radial width, or the use of special means for expanding the radial width of the resilient seal in the region of maximum radial width of the annular space. As a result the friction and wear at the sealing surfaces is minimized, the complication of a means of expanding the radial width of the resilient seal is avoided, and the effort necessary to overcome seal friction when changing the pitch of the runner blades is reduced, thereby enhancing the effectiveness of the pitch change servomechanism.

What we claim as new and desire to secure by Letters Patent of the United States is:

1. In a seal assembly for a machine having a first major component rotatably secured to a second major component about a pivot axis, including an annular seal recess between the major components in a substantially coaxial relation with the pivot axis, having a first continuous annular surface forming part of the recess in fixed sealed relation with one of said components and a second continuous annular surface forming part of the recess, spaced from said first annular surface and in fixed sealed relation with the other of said components, the improvement comprising; an annular seal ring located within said recess and positioned to seal the space between said annular surfaces, having a first surface thereof in facing, generally parallel spaced relation with said first recess surface, a second seal ring surface in facing generally parallel spaced relation with said second recess surface, first annular seal resilient ring means interposed between said first surfaces, second annular seal resilient ring means interposed between said second surfaces, and seal ring mounting means locating said seal ring concentrically within said recess substantially independently of deviations of a said major component from concentricity with the pivot axis.

2. An annular seal ring as claimed in claim 1 wherein said first surface comprises an axial end surface.

3. An annular seal ring as claimed in claim 2 wherein said first surface comprises a plain axial end surface in sealed sliding relation with a recess surface formed by an axially inner face of a said major component.

4. An annular seal ring as claimed in claim 3 wherein said second seal ring surface comprises the radially outer peripheral portion of said annular seal ring, having at least one groove extending circumferentially thereabout to receive a said resilient sealing ring for sealing engagement with said second recess surface, which extends normal to said first recess surface.

5. An annular seal ring as claimed in claim 4 wherein said annular ring includes a pair of said circumferential grooves, each containing a said resilient packing ring for sealing engagement with said second recess surface.

6. An annular seal ring as claimed in claim 2, claim 4, or claim 5 wherein said first continuous annular surface includes an annular recess therein substantially concentric with said pivot axis to receive a said resilient sealing ring for sealing and sliding contact with the adjacent axial end face of the annular seal ring.

7. An annular seal ring as claimed in claim 1, claim 4, or claim 5, wherein said recess second surface comprises the radially inner surface of an annular intermediate ring removably secured to said second major component in sealing relation therewith, having a resilient sealing ring interposed between the intermediate ring and the second major component in sealing relation therewith.

8. An annular seal ring as claimed in claim 5 wherein said recess second surface comprises the radially inner surface of an annular intermediate ring removeably secured to said second major component in sealing relation therewith, having a resilient sealing ring interposed between the intermediate ring and the second major component in mutual sealing relation therewith, said annular seal ring being slidably secured to said first major component to permit limited radial accommodation about the pivot axis, relative to the first major component by way of a retaining member having a stem portion substantially coaxially inserted through the centre of the annular seal ring and a head portion in axial facing relation with the axially inner end face of the seal ring.

9. An annular seal ring as claimed in claim 8 wherein said retaining member is removeably secured to said first major component by bolts, an intermediate annular ring forming said recess second surface being removeably secured to said second major component in axially slideable relation therewith, said second major component having a recess extension located axially inwardly of said retaining member and said intermediate ring, whereby the components of the seal may be axially disengaged from sealing contact with said resilient seal rings, to expose the resilient seal rings and permit replacement thereof.

10. A seal assembly for a Kaplan-type runner having runner blades angularly rotatable in relation to the main boss of the runner about bearing supports extending inwardly from the blades, to prevent leakage between the interior and the exterior of the runner, comprising; a recess in the runner hub to receive the blade boss therein, an annular portion of the blade boss inner face together with an annular portion of the runner hub housing recess defining an annular recess arranged substantailly coaxially with the axis of rotation of the blade relative to the hub; an annular floating seal member secured to the inner face of the blade boss in sealing and radial sliding relation therewith, relative to the blade rotational axis, having at least two circumferential grooves in the outer surface thereof to receive resilient sealing rings, being secured against rotation relative to the blade boss, sealing between the annular floating seal member and the inner face of the blade boss being effected by a resilient seal ring interposed therebetween; an intermediate annular ring member enclosing the floating seal member in substantially coplanar coaxial relation when in the operating position, having a radially inner annular surface in sealing contact with the two flexible sealing rings of the floating seal member and a radially outer annular portion in sealing relation with the recess in the runner hub, a flexible sealing ring being interposed therebetween to effect sealing of the intermediate ring member to the runner hub housing; and segmental seal retaining means securing the intermediate ring to the runner boss.

11. A seal assembly as claimed in claim 10 wherein said segmental seal retaining means are connected thereto by bolt means operable externally of the runner to reposition the intermediate ring axially within the housing, said floating seal member being similarly repositionable relative to said blade boss, whereby said resilient seal rings may be changed without removal of the runner blade from the runner, said floating seal member maintaining sealing of the runner hub interior despite minor misalignment of the runner blade rotation axis.

12. A seal assembly as claimed in claim 10 wherein said segmental seal retaining means are connected thereto by bolt means operable externally of the runner to reposition the intermediate ring axially within the housing, whereby said resilient sealing rings may be changed without removal of the runner blade from the runner.

References Cited

UNITED STATES PATENTS

| 1,866,580 | 7/1932 | Schmitthenner | 253—31 |
| 3,175,803 | 3/1965 | Newey et al. | 170—160.58 X |
| 3,179,423 | 4/1965 | McCloud | 277—174 X |

SAMUEL ROTHBERG, *Primary Examiner.*